United States Patent
Hsia

(10) Patent No.: US 10,869,373 B2
(45) Date of Patent: Dec. 15, 2020

(54) SOLID-STATE LIGHTING WITH HIGHLY INTEGRATED DRIVERS

(71) Applicant: Aleddra Inc., Renton, WA (US)

(72) Inventor: Chungho Hsia, Bellevue, WA (US)

(73) Assignee: Aleddra Inc., Renton, WA (US)

( * ) Notice: Subject to any disclaimer, the term of this patent is extended or adjusted under 35 U.S.C. 154(b) by 0 days.

(21) Appl. No.: 16/830,198

(22) Filed: Mar. 25, 2020

(65) Prior Publication Data

US 2020/0229279 A1 Jul. 16, 2020

Related U.S. Application Data

(63) Continuation-in-part of application No. 16/735,410, filed on Jan. 6, 2020, now Pat. No. 10,660,179, which is a continuation-in-part of application No. 16/694,970, filed on Nov. 25, 2019, now Pat. No. 10,602,597, which is a continuation-in-part of application No. 16/681,740, filed on Nov. 12, 2019, which is a continuation-in-part of application No. 16/664,034, filed on Oct. 25, 2019, now Pat. No. 10,660,184, which is a continuation-in-part of application No. 16/572,040, filed on Sep. 16, 2019, now Pat. No. 10,645,782, which is a continuation-in-part of application No. 16/547,502, filed on Aug. 21, 2019, now Pat. No. 10,485,073, which is a continuation-in-part of application No. 16/530,747, filed on Aug. 2, 2019, now Pat. No.
(Continued)

(51) Int. Cl.
*H05B 45/00* (2020.01)
*H02J 7/00* (2006.01)
*H05B 45/3725* (2020.01)
*H05B 45/36* (2020.01)

(52) U.S. Cl.
CPC ........ *H05B 45/3725* (2020.01); *H02J 7/0068* (2013.01); *H05B 45/36* (2020.01)

(58) Field of Classification Search
CPC ........ H05B 45/00; H05B 45/10; H05B 45/14; H05B 45/36; H05B 45/37; H05B 45/3725; H05B 47/00; H05B 47/10; H02J 7/007; H02J 7/0068; H02J 9/065
See application file for complete search history.

(56) References Cited

U.S. PATENT DOCUMENTS

2013/0200707 A1* 8/2013 Hartmann ............ H05B 45/46
307/39

* cited by examiner

*Primary Examiner* — Jimmy T Vu
(74) *Attorney, Agent, or Firm* — Han IP PLLC; Andy M. Han

(57) ABSTRACT

An LED luminaire comprises a rechargeable battery, LED array(s), two drivers, and a power outage detection circuit. The LED luminaire may be used to replace a conventional lamp connected to AC mains for use in emergency. The two drivers comprise a first driver configured to operate the LED array(s) and to manage to charge the rechargeable battery when the line voltage from the AC mains is available and a second driver configured to convert a terminal voltage from the rechargeable battery into a DC voltage to power the LED array(s) when a line voltage from the AC mains is unavailable. The power outage detection circuit is configured to enable or disable the second driver in proper situations and to meet regulatory requirements without operational ambiguity and safety issues. Furthermore, the first driver comprises a controllable current shunt circuit configured to regulate a charging current to flow into the rechargeable battery.

12 Claims, 2 Drawing Sheets

Related U.S. Application Data 10,492,265, which is a continuation-in-part of application No. 16/458,823, filed on Jul. 1, 2019, now Pat. No. 10,485,065, which is a continuation-in-part of application No. 16/432,735, filed on Jun. 5, 2019, now Pat. No. 10,390,396, which is a continuation-in-part of application No. 16/401,849, filed on May 2, 2019, now Pat. No. 10,390,395, which is a continuation-in-part of application No. 16/296,864, filed on Mar. 8, 2019, now Pat. No. 10,390,394, which is a continuation-in-part of application No. 16/269,510, filed on Feb. 6, 2019, now Pat. No. 10,314,123, which is a continuation-in-part of application No. 16/247,456, filed on Jan. 14, 2019, now Pat. No. 10,327,298, which is a continuation-in-part of application No. 16/208,510, filed on Dec. 3, 2018, now Pat. No. 10,237,946, which is a continuation-in-part of application No. 16/154,707, filed on Oct. 8, 2018, now Pat. No. 10,225,905, which is a continuation-in-part of application No. 15/947,631, filed on Apr. 6, 2018, now Pat. No. 10,123,388, which is a continuation-in-part of application No. 15/911,086, filed on Mar. 3, 2018, now Pat. No. 10,136,483, which is a continuation-in-part of application No. 15/897,106, filed on Feb. 14, 2018, now Pat. No. 10,161,616, which is a continuation-in-part of application No. 15/874,752, filed on Jan. 18, 2018, now Pat. No. 10,036,515, which is a continuation-in-part of application No. 15/836,170, filed on Dec. 8, 2017, now Pat. No. 10,021,753, which is a continuation-in-part of application No. 15/649,392, filed on Jul. 13, 2017, now Pat. No. 9,986,619, which is a continuation-in-part of application No. 15/444,536, filed on Feb. 28, 2017, now Pat. No. 9,826,595, which is a continuation-in-part of application No. 15/362,772, filed on Nov. 28, 2016, now Pat. No. 9,967,927, which is a continuation-in-part of application No. 15/225,748, filed on Aug. 1, 2016, now Pat. No. 9,743,484, which is a continuation-in-part of application No. 14/818,041, filed on Aug. 4, 2015, now Pat. No. 9,420,663, which is a continuation-in-part of application No. 14/688,841, filed on Apr. 16, 2015, now Pat. No. 9,288,867, which is a continuation-in-part of application No. 14/465,174, filed on Aug. 21, 2014, now Pat. No. 9,277,603, which is a continuation-in-part of application No. 14/135,116, filed on Dec. 19, 2013, now Pat. No. 9,163,818, which is a continuation-in-part of application No. 13/525,249, filed on Jun. 15, 2012, now Pat. No. 8,749,167.

SOLID-STATE LIGHTING WITH HIGHLY INTEGRATED DRIVERS

CROSS-REFERENCE TO RELATED APPLICATIONS

The present disclosure is part of a continuation-in-part (CIP) application of U.S. patent application Ser. No. 16/735,410, filed 6 Jan. 2020, which is part of CIP application of U.S. patent application Ser. No. 16/694,970, filed 25 Nov. 2019 and issued as U.S. Pat. No. 10,602,597 on 24 Mar. 2020, which is part of CIP application of U.S. patent application Ser. No. 16/681,740, filed 12 Nov. 2019, which is part of CIP application of U.S. patent application Ser. No. 16/664,034, filed 25 Oct. 2019, which is part of CIP application of U.S. patent application Ser. No. 16/572,040, filed 16 Sep. 2019, which is part of CIP application of U.S. patent application Ser. No. 16/547,502, filed 21 Aug. 2019 and issued as U.S. Pat. No. 10,485,073 on 19 Nov. 2019, which is part of CIP application of U.S. patent application Ser. No. 16/530,747, filed 2 Aug. 2019 and issued as U.S. Pat. No. 10,492,265 on 26 Nov. 2019, which is part of CIP application of U.S. patent application Ser. No. 16/458,823, filed 1 Jul. 2019 and issued as U.S. Pat. No. 10,485,065 on 10 Nov. 2019, which is part of CIP application of U.S. patent application Ser. No. 16/432,735, filed 5 Jun. 2019 and issued as U.S. Pat. No. 10,390,396 on 20 Aug. 2019, which is part of CIP application of U.S. patent application Ser. No. 16/401,849, filed 2 May 2019 and issued as U.S. Pat. No. 10,390,395 on 20 Aug. 2019, which is part of CIP application of U.S. patent application Ser. No. 16/296,864, filed 8 Mar. 2019 and issued as U.S. Pat. No. 10,390,394 on 20 Aug. 2019, which is part of CIP application of U.S. patent application Ser. No. 16/269,510, filed 6 Feb. 2019 and issued as U.S. Pat. No. 10,314,123 on 4 Jun. 2019, which is part of CIP application of U.S. patent application Ser. No. 16/247,456, filed 14 Jan. 2019 and issued as U.S. Pat. No. 10,327,298 on 18 Jun. 2019, which is part of CIP application of U.S. patent application Ser. No. 16/208,510, filed 3 Dec. 2018 and issued as U.S. Pat. No. 10,237,946 on 19 Mar. 2019, which is part of CIP application of U.S. patent application Ser. No. 16/154,707, filed 8 Oct. 2018 and issued as U.S. Pat. No. 10,225,905 on 5 Mar. 2019, which is part of a CIP application of U.S. patent application Ser. No. 15/947,631, filed 6 Apr. 2018 and issued as U.S. Pat. No. 10,123,388 on 6 Nov. 2018, which is part of a CIP application of U.S. patent application Ser. No. 15/911,086, filed 3 Mar. 2018 and issued as U.S. Pat. No. 10,136,483 on 20 Nov. 2018, which is part of a CIP application of U.S. patent application Ser. No. 15/897,106, filed 14 Feb. 2018 and issued as U.S. Pat. No. 10,161,616 on 25 Dec. 2018, which is a CIP application of U.S. patent application Ser. No. 15/874,752, filed 18 Jan. 2018 and issued as U.S. Pat. No. 10,036,515 on 31 Jul. 2018, which is a CIP application of U.S. patent application Ser. No. 15/836,170, filed 8 Dec. 2017 and issued as U.S. Pat. No. 10,021,753 on 10 Jul. 2018, which is a CIP application of U.S. patent application of Ser. No. 15/649,392 filed 13 Jul. 2017 and issued as U.S. Pat. No. 9,986,619 on 29 May 2018, which is a CIP application of U.S. patent application Ser. No. 15/444,536, filed 28 Feb. 2017 and issued as U.S. Pat. No. 9,826,595 on 21 Nov. 2017, which is a CIP application of U.S. patent application Ser. No. 15/362,772, filed 28 Nov. 2016 and issued as U.S. Pat. No. 9,967,927 on 8 May 2018, which is a CIP application of U.S. patent application Ser. No. 15/225,748, filed 1 Aug. 2016 and issued as U.S. Pat. No. 9,743,484 on 22 Aug. 2017, which is a CIP application of U.S. patent application Ser. No. 14/818,041, filed 4 Aug. 2015 and issued as U.S. Pat. No. 9,420,663 on 16 Aug. 2016, which is a CIP application of U.S. patent application Ser. No. 14/688,841, filed 16 Apr. 2015 and issued as U.S. Pat. No. 9,288,867 on 15 Mar. 2016, which is a CIP application of U.S. patent application Ser. No. 14/465,174, filed 21 Aug. 2014 and issued as U.S. Pat. No. 9,277,603 on 1 Mar. 2016, which is a CIP application of U.S. patent application Ser. No. 14/135,116, filed 19 Dec. 2013 and issued as U.S. Pat. No. 9,163,818 on 20 Oct. 2015, which is a CIP application of U.S. patent application Ser. No. 13/525,249, filed 15 Jun. 2012 and issued as U.S. Pat. No. 8,749,167 on 10 Jun. 2014. Contents of the above-identified applications are incorporated herein by reference in their entirety.

BACKGROUND

Technical Field

The present disclosure relates to light-emitting diode (LED) luminaires and more particularly to an LED luminaire with highly integrated drivers auto-selected for operations with a line voltage from alternate-current (AC) mains or a direct-current (DC) voltage from a rechargeable battery without ambiguity.

Description of the Related Art

Solid-state lighting from semiconductor LEDs has received much attention in general lighting applications today. Because of its potential for more energy savings, better environmental protection (with no hazardous materials used), higher efficiency, smaller size, and longer lifetime than conventional incandescent bulbs and fluorescent tubes, the LED-based solid-state lighting will be a mainstream for general lighting in the near future. Meanwhile, as LED technologies develop with the drive for energy efficiency and clean technologies worldwide, more families and organizations will adopt LED lighting for their illumination applications. In this trend, the potential safety concerns such as risk of electric shock and fire become especially important and need to be well addressed.

In today's retrofit applications of an LED lamp to replace an existing fluorescent lamp, consumers may choose either to adopt a ballast-compatible LED lamp with an existing ballast used to operate the fluorescent lamp or to employ an AC mains-operable LED lamp by removing/bypassing the ballast. Either application has its advantages and disadvantages. In the former case, although the ballast consumes extra power, it is straightforward to replace the fluorescent lamp without rewiring, which consumers have a first impression that it is the best alternative. But the fact is that total cost of ownership for this approach is high regardless of very low initial cost. For example, the ballast-compatible LED lamps work only with particular types of ballasts. If the existing ballast is not compatible with the ballast-compatible LED lamp, the consumer will have to replace the ballast. Some facilities built long time ago incorporate different types of fixtures, which requires extensive labor for both identifying ballasts and replacing incompatible ones. Moreover, the ballast-compatible LED lamp can operate longer than the ballast. When an old ballast fails, a new ballast will be needed to replace in order to keep the ballast-compatible LED lamps working. Maintenance will be complicated, sometimes for the lamps and sometimes for the ballasts. The incurred cost will preponderate over the initial cost savings by changeover to the ballast-compatible LED lamps for hundreds of fixtures throughout a facility. In addition, replacing a failed ballast requires a certified electrician. The labor costs and long-term maintenance costs will be unacceptable to end users. From energy saving point of view, a ballast constantly draws power, even when the ballast-compatible LED lamps are dead or not installed. In this sense, any energy saved while using the ballast-compatible LED lamps becomes meaningless with the constant energy use by the ballast. In the long run, the ballast-compatible LED lamps are more expensive and less efficient than self-sustaining AC mains-operable LED lamps.

On the contrary, an AC mains-operable LED lamp does not require a ballast to operate. Before use of the AC mains-operable LED lamp, the ballast in a fixture must be removed or bypassed. Removing or bypassing the ballast does not require an electrician and can be replaced by end users. Each AC mains-operable LED lamp is self-sustaining. Once installed, the AC mains-operable LED lamps will only need to be replaced after 50,000 hours. In view of above advantages and disadvantages of both the ballast-compatible LED lamps and the AC mains-operable LED lamps, it seems that market needs a most cost-effective solution by using a universal LED lamp that can be used with the AC mains and is compatible with a ballast so that LED lamp users can save an initial cost by changeover to such an LED lamp followed by retrofitting the lamp fixture to be used with the AC mains when the ballast dies.

Furthermore, the AC mains-operable LED lamps can easily be used with emergency lighting, which is especially important in this consumerism era. The emergency lighting systems in retail sales and assembly areas with an occupancy load of 100 or more are required by codes in many cities. Occupational Safety and Health Administration (OSHA) requires that a building's exit paths be properly and automatically lighted at least ninety minutes of illumination at a minimum of 10.8 lux so that an employee with normal vision can see along the exit route after the building power becomes unavailable. This means that emergency egress lighting must operate reliably and effectively during low visibility evacuations. To ensure reliability and effectiveness of backup lighting, building owners should abide by the National Fire Protection Association's (NFPA) emergency egress light requirements that emphasize performance, operation, power source, and testing. OSHA requires most commercial buildings to adhere to the NFPA standards or a significant fine. Meeting OSHA requirements takes time and investment, but not meeting them could result in fines and even prosecution. If a building has egress lighting problems that constitute code violations, the quickest way to fix is to replace existing lamps with multi-function LED lamps that have an emergency light package integrated with the normal lighting. The code also requires the emergency lights be inspected and tested for 30 seconds once a month and at least 90 minutes once a year to ensure they are in proper working conditions at all times. However, even if the emergency lights cannot be inspected and tested to meet the requirements, consumers still need such emergency lights to be used when a power outage occurs. It is, therefore, a motive to design an LED lamp or an LED luminaire with a cost-effective solution such that after installed on a ceiling or in a room, such LED lamps or the LED luminaires can automatically switch over from a normal mode to an emergency mode without ambiguity.

SUMMARY

A light-emitting diode (LED) luminaire comprising at least two electrical conductors, one or more LED arrays, a rechargeable battery, a first full-wave rectifier coupled to the at least two electrical conductors, a second full-wave rectifier, an across-the-line filter, a first driver, a second driver, and a power outage detection circuit is used to replace a fluorescent or a conventional LED luminaire in luminaire fixture sockets connected to alternate-current (AC) mains. The LED luminaire with two drivers auto-selects for operations with a line voltage from the AC mains or a DC voltage from a rechargeable battery. The across-the-line capacitor is configured to suppress electromagnetic interference (EMI) noises on the line voltage from the AC mains. The first full-wave rectifier is configured to convert a line voltage from the AC mains into a first DC voltage. The one or more LED arrays comprise a positive potential terminal and a negative potential terminal with a forward voltage across thereon. The rechargeable battery comprises a positive potential terminal and a negative potential terminal with a terminal voltage across thereon.

The first driver further comprises an input filter configured to suppress EMI noises, an inductor, a diode connected in series with the inductor, a first ground reference, a second ground reference, an electronic switch, a sensing resistor, and an output capacitor connected between the diode and the second ground reference. The first driver is configured to convert the first DC voltage into a second DC voltage to power up the one or more LED arrays at full power and to meet LED luminaire efficacy requirements when the line voltage from the AC mains is available. The first driver further comprises a first diode and a controllable current shunt circuit configured to regulate a charging current to flow into the rechargeable battery so as to reach a nominal level of the terminal voltage. The controllable current shunt circuit comprises a third ground reference common to the negative potential terminal of the rechargeable battery. That is, the third ground reference has the same electrical potential as the negative potential terminal of the rechargeable battery.

The second driver comprises a transformer and a second full-wave rectifier. The transformer comprises a primary winding and a secondary winding with the second full-wave rectifier coupled to the secondary winding. The second driver is configured to receive the terminal voltage from the rechargeable battery and to generate a third DC voltage to light up the one or more LED arrays when the line voltage from the AC mains is unavailable.

The power outage detection circuit comprises a first transistor circuit configured to enable the second driver when the line voltage from the AC mains is unavailable. The power outage detection circuit is configured to couple to the line voltage from the AC mains from the at least two electrical conductors.

The power outage detection circuit comprises the first transistor circuit configured to enable the second driver when the line voltage from the AC mains is unavailable. The power outage detection circuit is configured to couple to the line voltage from the AC mains via the at least two electrical conductors. The power outage detection circuit is further configured to control the rechargeable battery to discharge so as to operate the second driver. The power outage detection circuit further comprises a second transistor circuit. The second transistor circuit is configured to detect the line voltage from the AC mains and to receive a first signal from the terminal voltage and a second signal from the negative potential terminal of the one or more LED arrays. The second transistor circuit is configured to turn off the first transistor circuit when the line voltage from the AC mains is available, thereby disabling the second driver. When the line voltage from the AC mains is unavailable, the second transistor circuit conducts an electric current to turn on the first transistor circuit, thereby enabling the second driver. The second transistor circuit comprises a first transistor, a second transistor, and a second at least one diode. The first transistor is configured to detect the line voltage from the AC mains and to receive the first signal from the terminal voltage and the second signal from the negative potential terminal of the one or more LED arrays. The first transistor is further configured to turn off the second transistor when the line voltage from the AC mains is available, subsequently turning off the first transistor circuit. The first transistor circuit, the second transistor circuit, and the rechargeable battery are in communications with one another in a way that the second transistor circuit first determines whether the line voltage from the AC mains is available or not, then compares the first signal from the terminal voltage with the second signal from the negative potential terminal of the one or more LED arrays, and finally controls the first transistor circuit to be switched off or switched on without ambiguity.

The first diode is configured to couple to both the rechargeable battery and the first transistor circuit. The rechargeable battery is configured to discharge to operate the second driver via the first transistor circuit. The rechargeable battery is further configured to be charged via the first diode. The first diode and the rechargeable battery coupled in series with the first diode are configured to couple in parallel with the controllable current shunt circuit. When the first driver is operated and when the line voltage of the AC mains is available, the second DC voltage is generated. The second DC voltage is configured to apply across the one or more LED arrays with a first LED driving current flowing into and out of the one or more LED arrays. A part of the first LED driving current flows into the rechargeable battery to charge thereof whereas rest of the first LED driving current flows into controllable current shunt circuit.

The controllable current shunt circuit comprises a third at least one diode and a regulating device. The controllable current shunt circuit further comprises a resistor and a capacitor coupled with each other to form an electronic integrator configured to receive the voltage level of the terminal voltage and to average out spikes on the terminal voltage when a charging current starts to flow into the rechargeable battery. The third at least one diode is configured to control a flowing direction of a shunt current from the negative potential terminal of the one or more LED arrays and to set up a voltage drop. The regulating device is configured to monitor the voltage level of the terminal voltage and to regulate the shunt current. When the voltage level of the terminal voltage becomes higher and higher, the regulating device continuously controls the shunt current to be larger and larger, leading to the charging current flowing into the rechargeable battery smaller and smaller.

The second driver comprises the transformer and the second full-wave rectifier. The second driver further comprises a capacitor, a third transistor, and a fourth transistor with the capacitor connected in parallel with the primary winding alternately driven to a positive potential of the terminal voltage and a negative potential of the terminal voltage by operations of the third transistor and the fourth transistor, thereby creating primary energy pulses in the primary winding when the line voltage from the AC mains is unavailable. The secondary winding is induced to create secondary energy pulses when the primary energy pulses exist. The second full-wave rectifier is configured to convert the secondary energy pulses into the third DC voltage. Each of the third transistor and the fourth transistor comprises an electrode coupled each other. The electrode receives the line voltage from the AC mains and is configured to pull up a potential at the electrode when the line voltage from the AC mains exists, thereby deactivating the third transistor 506 and the fourth transistor, consequently disabling the second driver. The second driver further comprises a fourth diode configured to receive a second LED driving current returned from the negative potential terminal of the one or more LED arrays when the line voltage from the AC mains is unavailable and when the third DC voltage is applied to the one or more LED arrays. The second LED driving current returned from the negative potential terminal of the one or more LED arrays is looped back to the secondary winding of the transformer via the second full-wave rectifier for a power transfer to the one or more LED arrays.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified. Moreover, in the section of detailed description of the invention, any of a "primary", a "secondary", a "first", a "second", a "third", and so forth does not necessarily represent a part that is mentioned in an ordinal manner, but a particular one.

DETAILED DESCRIPTION OF THE INVENTION

Figure 1:
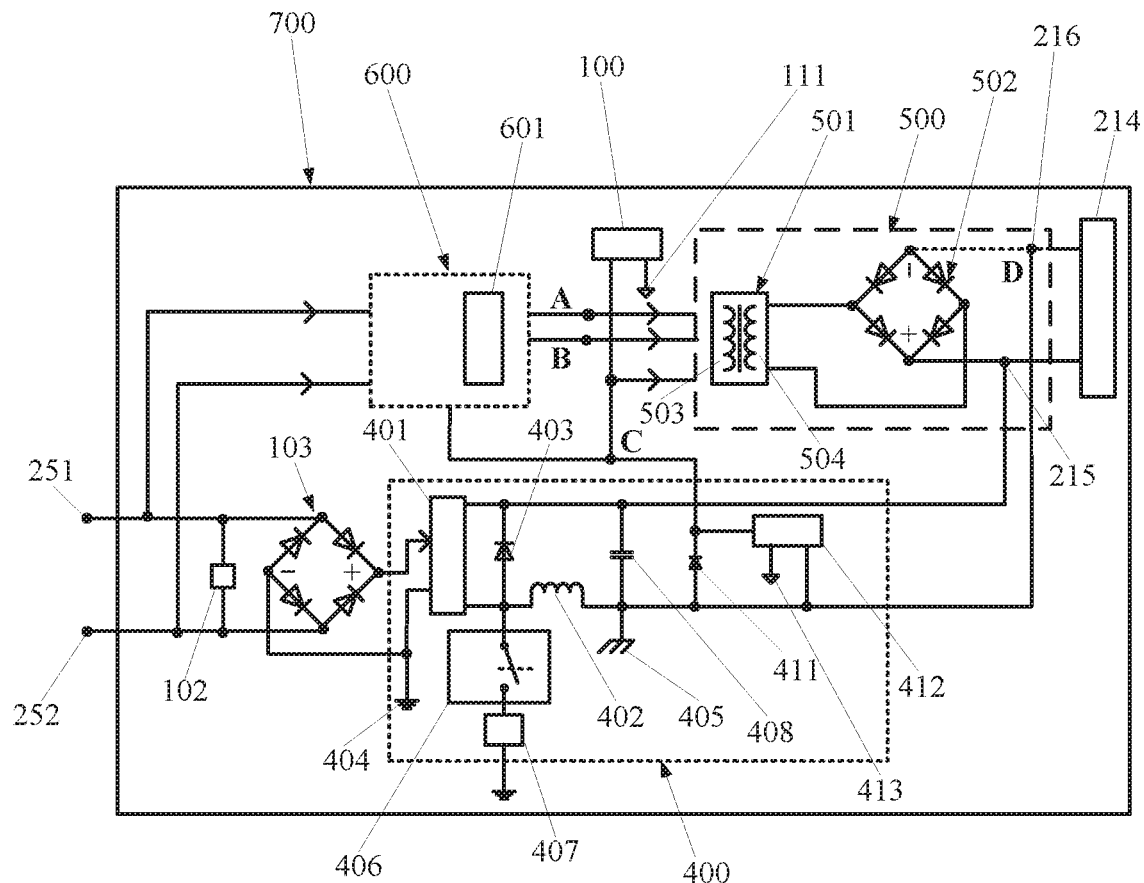
FIG. 1 is a block diagram of an LED luminaire with two drivers auto-selected for operations with a line voltage from the AC mains or a DC voltage from a rechargeable battery according to the present disclosure.

FIG. 1 is a block diagram of an LED luminaire 700 with two drivers auto-selected for operations with a line voltage from the AC mains or a DC voltage from a rechargeable battery according to the present disclosure. The LED luminaire 700 comprises one or more LED arrays 214, at least two electrical conductors 251 and 252, an across-the-line capacitor 102 configured to suppress electromagnetic interference (EMI) noises on the line voltage from the AC mains, a first full-wave rectifier 103 connected to the at least two electrical conductors 251 and 252, a rechargeable battery 100, a first driver 400, a second driver 500, and a power outage detection circuit 600. The first full-wave rectifier 103 is configured to convert a line voltage from the AC mains into a first DC voltage. The one or more LED arrays 214 comprise a positive potential terminal 215 and a negative potential terminal 216 with a forward voltage across thereon. The rechargeable battery 100 comprises a positive potential terminal denoted as "C" and a negative potential terminal 111 with a terminal voltage across thereon.

In FIG. 1, the first driver 400 further comprises an input filter 401 configured to suppress EMI noises, an inductor 402, a diode 403 connected in series with the inductor 402, a first ground reference 404, a second ground reference 405, an electronic switch 406, a sensing resistor 407, and an output capacitor 408 connected between the diode 403 and the second ground reference 405. The first driver 400 is configured to convert the first DC voltage into a second DC voltage to power up the one or more LED arrays 214 at full power and to meet LED luminaire efficacy requirements when the line voltage from the AC mains is available. The first driver 400 further comprises a first diode 411 and a controllable current shunt circuit 412 configured to regulate a charging current to flow into the rechargeable battery 100 so as to reach a nominal level of the terminal voltage over a period of time. The controllable current shunt circuit 412 comprises a third ground reference 413 common to the negative potential terminal 111 of the rechargeable battery 100. That is, the third ground reference 413 has the same electrical potential as the negative potential terminal 111 of the rechargeable battery 100.

In FIG. 1, the second driver 500 comprises a transformer 501 and a second full-wave rectifier 502. The transformer 501 comprises a primary winding 503 and a secondary winding 504 with the second full-wave rectifier 502 coupled to the secondary winding 504. The second driver 500 is configured to receive the terminal voltage from the rechargeable battery 100 and to generate a third DC voltage to light up the one or more LED arrays 214 when the line voltage from the AC mains is unavailable.

In FIG. 1, the power outage detection circuit 600 comprises a first transistor circuit 601 configured to enable the second driver 500 via a port "A" when the line voltage from the AC mains is unavailable. The power outage detection circuit 600 is further configured to control the rechargeable battery 100 to discharge via a port "C" so as to operate the second driver 500. The power outage detection circuit 600 is further configured to deactivate the second driver via a port "B" when the line voltage from the AC mains is available. The power outage detection circuit 600 is configured to couple to the line voltage from the AC mains from the at least two electrical conductors 251 and 252.

Figure 2:
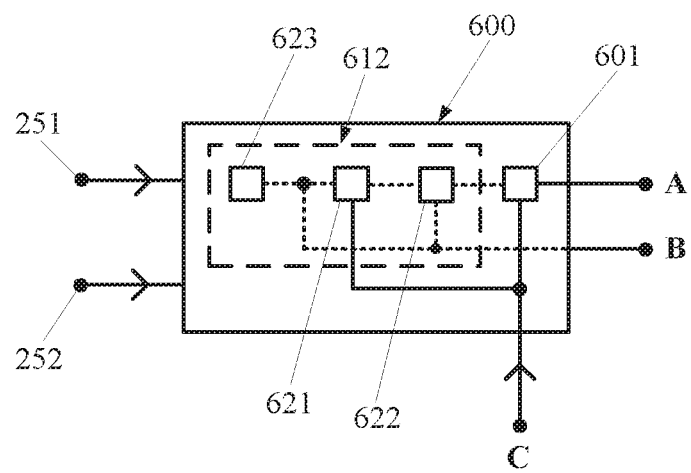
FIG. 2 is a block diagram of a power outage detection circuit according to the present disclosure.

FIG. 2 is a block diagram of a power outage detection circuit according to the present disclosure. As depicted in FIG. 1, the power outage detection circuit 600 comprises the first transistor circuit 601 configured to enable the second driver 500 via the port "A" when the line voltage from the AC mains is unavailable. The power outage detection circuit 600 is configured to couple to the line voltage from the AC mains via the at least two electrical conductors 251 and 252. The power outage detection circuit 600 is further configured to control the rechargeable battery 100 to discharge via the port "C" so as to operate the second driver 500. The power outage detection circuit 600 is further configured to deactivate the second driver via a port "B" when the line voltage from the AC mains is available. In FIG. 2, the power outage detection circuit 600 comprises the first transistor circuit 601 and a second transistor circuit 612. The power outage detection circuit 600 is configured to detect the line voltage from the AC mains and to receive a first signal from the terminal voltage and a second signal from the negative potential terminal 216 of the one or more LED arrays 214. The second transistor circuit 612 is configured to turn off the first transistor circuit 601 when the line voltage from the AC mains is available, thereby disabling the second driver 500. When the line voltage from the AC mains is unavailable, the second transistor circuit 612 conducts an electric current to turn on the first transistor circuit 601, thereby enabling the second driver 500. The second transistor circuit 612 comprises a first transistor 621, a second transistor 622, and a second at least one diode 623. The first transistor 621 is configured to detect the line voltage from the AC mains and to receive the first signal from the terminal voltage and the second signal from the negative potential terminal 216 of the one or more LED arrays 214. The first transistor 621 is further configured to turn off the second transistor 622 when the line voltage from the AC mains is available, subsequently turning off the first transistor circuit 601. In other words, the first transistor circuit 601, the second transistor circuit 612, and the rechargeable battery 100 are in communications with one another in a way that the second transistor circuit 612 first determines whether the line voltage from the AC mains is available or not, then compares the first signal from the terminal voltage with the second signal from the negative potential terminal 216 of the one or more LED arrays 214, and finally controls the first transistor circuit 601 to be switched off or switched on without ambiguity.

Referring to FIG. 1 and FIG. 2, the first diode 411 is configured to electrically couple to both the rechargeable battery 100 and the first transistor circuit 601 via the port "C". The rechargeable battery 100 is configured to discharge to operate the second driver 500 via the first transistor circuit 601. The rechargeable battery 100 is further configured to be charged via the first diode 411. The first diode 411 and the rechargeable battery 100 coupled in series with the first diode 411 are configured to couple in parallel with the controllable current shunt circuit 412. When the first driver 400 is operated and when the line voltage of the AC mains is available, the second DC voltage is generated. The second DC voltage is configured to apply across the one or more LED arrays 214 with a first LED driving current flowing into and out of the one or more LED arrays 214. A part of the first LED driving current flows into the rechargeable battery 100 to charge thereof whereas rest of the first LED driving current flows into the controllable current shunt circuit 412.

Figure 3:
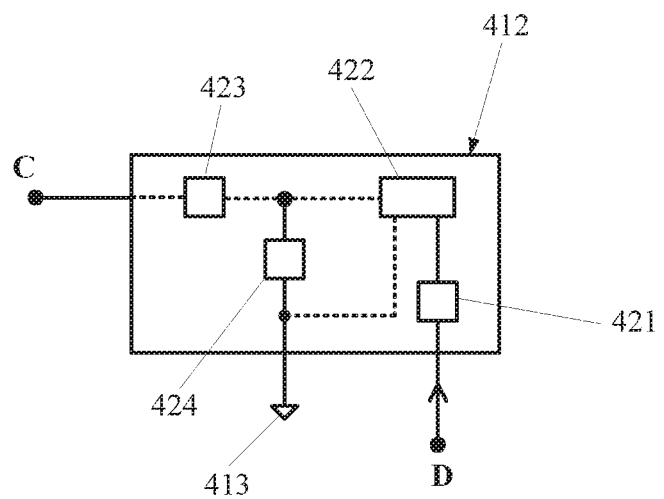
FIG. 3 is a block diagram of a controllable current shunt circuit according to the present disclosure.

FIG. 3 is a block diagram of a controllable current shunt circuit according to the present disclosure. The controllable current shunt circuit 412 comprises a third at least one diode 421 and a regulating device 422. In FIG. 3, the controllable current shunt circuit 412 further comprises a resistor 423 and a capacitor 424 coupled with each other to form an electronic integrator configured to receive the voltage level of the terminal voltage from the port "C" and to average out spikes on the terminal voltage when a charging current starts to flow into the rechargeable battery 100. The third at least one diode 421 is configured to control a flowing direction of a shunt current from the negative potential terminal 216 of the one or more LED arrays 214, denoted in FIG. 1 and FIG. 3 as "D", and to set up a voltage drop. The regulating device 422 is configured to monitor the voltage level of the terminal voltage and to regulate the shunt current. When the voltage level of the terminal voltage becomes higher and higher, the regulating device 422 continuously controls the shunt current to be larger and larger, leading to the charging current flowing into the rechargeable battery 100 smaller and smaller.

Figure 4:
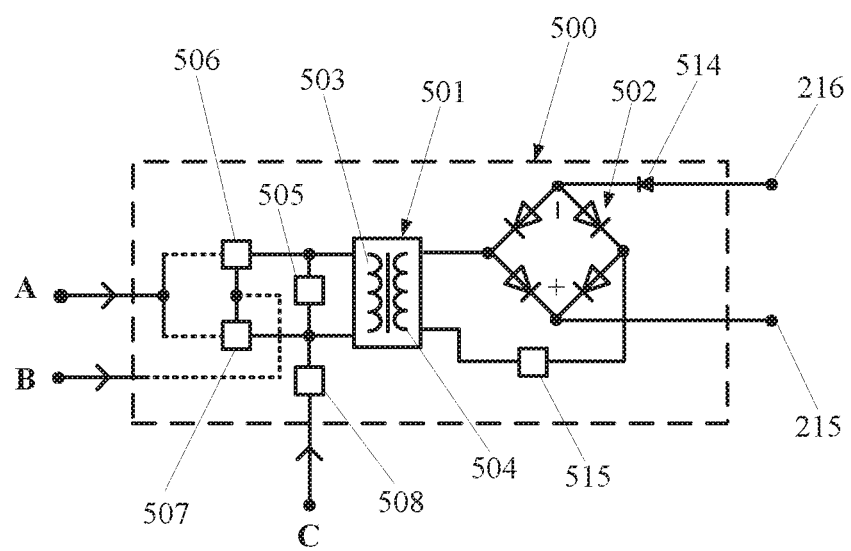
FIG. 4 is a block diagram of a second driver according to the present disclosure.

FIG. 4 is a block diagram of a second driver according to the present disclosure. As depicted in FIG. 1, the second driver 500 comprises the transformer 501 and the second full-wave rectifier 502. In FIG. 4, the second driver 500 further comprises a capacitor 505, a third transistor 506, and a fourth transistor 507 with the capacitor 505 connected in parallel with the primary winding 503 alternately driven to a positive potential of the terminal voltage and a negative potential of the terminal voltage by operations of the third transistor 506 and the fourth transistor 507, thereby creating primary energy pulses in the primary winding 503 when the line voltage from the AC mains is unavailable. The secondary winding 504 is induced to create secondary energy pulses when the primary energy pulses exist. The second full-wave rectifier 502 is configured to convert the secondary energy pulses into the third DC voltage. Each of the third transistor 506 and the fourth transistor 507 comprises an electrode coupled each other. The electrode receives the line voltage from the AC mains via the port "B" and is configured to pull up a potential at the electrode when the line voltage from the AC mains exists, thereby deactivating the third transistor 506 and the fourth transistor 507, consequently disabling the second driver 500. The second driver 500 further comprises a fourth diode 514 configured to receive a second LED driving current returned from the negative potential terminal 216 of the one or more LED arrays 214 when the line voltage from the AC mains is unavailable and when the third DC voltage is applied to the one or more LED arrays 214. The second LED driving current returned from the negative potential terminal 216 of the one or more LED arrays 214 is looped back to the secondary winding 504 of the transformer 501 via the second full-wave rectifier 502 for a power transfer to the one or more LED arrays 214. In FIG. 4, the third transistor 506 and the fourth transistor 507 are configured to turn on and off a loop of the primary winding 503. The power of the rechargeable battery 100 is inputted to the primary winding 503 via the port "C" passing through an inductor 508. The second driver 500 further comprises a capacitor 515 coupled between the secondary winding 504 and the second full-wave rectifier 502.

Whereas preferred embodiments of the present disclosure have been shown and described, it will be realized that alterations, modifications, and improvements may be made thereto without departing from the scope of the following claims. Another kind of schemes with two drivers adopted in an LED-based luminaire using various kinds of combinations to accomplish the same or different objectives could be easily adapted for use from the present disclosure. Accordingly, the foregoing descriptions and attached drawings are by way of example only and are not intended to be limiting.

What is claimed is:

1. A light-emitting diode (LED) luminaire, comprising:
   at least two electrical conductors configured to couple to alternate-current (AC) mains;
   one or more LED arrays comprising a positive potential terminal and a negative potential terminal, with a forward voltage across thereon;
   a rechargeable battery with a terminal voltage;
   a first full-wave rectifier coupled to the at least two electrical conductors and configured to convert a line voltage from the AC mains into a first direct-current (DC) voltage;
   a first driver comprising an input inductor, a diode connected in series with the input inductor, a first ground reference, and an output capacitor connected between the diode and the first ground reference, the first driver configured to convert the first DC voltage into a second DC voltage to power up the one or more LED arrays at full power and to meet LED luminaire efficacy requirements when the line voltage from the AC mains is available;
   a second driver comprising a transformer and a second full-wave rectifier, wherein the transformer comprises a primary winding and a secondary winding with the second full-wave rectifier coupled to the secondary winding, wherein the second driver is configured to receive the terminal voltage from the rechargeable battery and to generate a third DC voltage to light up the one or more LED arrays when the line voltage from the AC mains is unavailable; and
   a power outage detection circuit comprising a first transistor circuit configured to enable the second driver when the line voltage from the AC mains is unavailable,
   wherein:
   the first driver, the second driver, and the power outage detection circuit are configured to select either the second DC voltage or the third DC voltage to operate the one or more LED arrays; and
   the first driver further comprises a controllable current shunt circuit configured to regulate a charging current to flow into the rechargeable battery so as to reach a nominal level of the terminal voltage over a period of time.

2. The LED luminaire of claim 1, wherein the first driver further comprises a first diode configured to couple to both the rechargeable battery and the first transistor circuit, wherein the rechargeable battery is configured to discharge to operate the second driver via the first transistor circuit, and wherein the rechargeable battery is further configured to be charged via the first diode.

3. The LED luminaire of claim 1, wherein the power outage detection circuit further comprises a second transistor circuit, wherein the second transistor circuit is configured to detect the line voltage from the AC mains and to receive a first signal from the terminal voltage and a second signal from the negative potential terminal of the one or more LED arrays, and wherein the second transistor circuit is configured to turn off the first transistor circuit when the line voltage from the AC mains is available, thereby disabling the second driver.

4. The LED luminaire of claim 3, wherein when the line voltage from the AC mains is unavailable, the second transistor circuit conducts an electric current to turn on the first transistor circuit, thereby enabling the second driver.

5. The LED luminaire of claim 3, wherein the second transistor circuit comprises a first transistor, a second transistor, and a second at least one diode, wherein the first transistor is configured to detect the line voltage from the AC mains and to receive the first signal from the terminal voltage and the second signal from the negative potential terminal of the one or more LED arrays, and wherein the first transistor is further configured to turn off the second transistor when the line voltage from the AC mains is available, subsequently turning off the first transistor circuit.

6. The LED luminaire of claim 3, wherein the first transistor circuit, the second transistor circuit, and the rechargeable battery are in communications with one another in a way that the second transistor circuit first determines whether the line voltage from the AC mains is available or not, then compares the first signal from the terminal voltage with the second signal from the negative potential terminal of the one or more LED arrays, and finally controls the first transistor circuit to be switched off or switched on without ambiguity.

7. The LED luminaire of claim 1, wherein the controllable current shunt circuit comprises a third at least one diode and a regulating device, wherein the third at least one diode is configured to control a flowing direction of a shunt current and to set up a voltage drop, and wherein the regulating device is configured to regulate the shunt current.

8. The LED luminaire of claim 1, wherein the second driver further comprises a capacitor, a third transistor, and a fourth transistor with the capacitor connected in parallel with the primary winding alternately driven to a positive potential of the terminal voltage and a negative potential of the terminal voltage by operations of the third transistor and the fourth transistor, thereby creating primary energy pulses in the primary winding when the line voltage from the AC mains is unavailable.

9. The LED luminaire of claim 8, wherein the secondary winding is induced to create secondary energy pulses when the primary energy pulses exist, and wherein the second full-wave rectifier is configured to convert the secondary energy pulses into the third DC voltage.

10. The LED luminaire of claim 8, wherein each of the third transistor and the fourth transistor comprises an electrode coupled each other, wherein the electrode is configured to detect the line voltage from the AC mains, and wherein a potential of the electrode is pulled up to deactivate the third transistor and the fourth transistor, thereby disabling the second driver.

11. The LED luminaire of claim 2, wherein the first diode and the rechargeable battery coupled in series with the first diode are configured to couple in parallel with the controllable current shunt circuit, wherein the second DC voltage is configured to apply across the one or more LED arrays with a first LED driving current flowing into and out of the one or more LED arrays when the line voltage from the AC mains is available, and wherein a part of the first LED driving current flows into the rechargeable battery to charge thereof.

12. The LED luminaire of claim 1, wherein the second driver further comprises a fourth diode configured to receive a second LED driving current returned from the negative potential terminal of the one or more LED arrays when the line voltage from the AC mains is unavailable, and wherein the second LED driving current returned from the negative potential terminal of the one or more LED arrays is looped back to the secondary winding of the transformer via the second full-wave rectifier for a power transfer to the one or more LED arrays.

* * * * *